United States Patent
Wu et al.

(10) Patent No.: US 9,634,504 B2
(45) Date of Patent: Apr. 25, 2017

(54) BATTERY CHARGING GRAPHICAL USER INTERFACE FOR WIRELESS POWER TRANSFER

(71) Applicant: Wireless Advanced Vehicle Electrification, Inc., Park City, UT (US)

(72) Inventors: Hunter Wu, Salt Lake City, UT (US); Michael Masquelier, Park City, UT (US)

(73) Assignee: WIRELESS ADVANCED VEHICLE ELECTRIFICATION, INC., Park City, UT (US)

( * ) Notice: Subject to any disclaimer, the term of this patent is extended or adjusted under 35 U.S.C. 154(b) by 408 days.

(21) Appl. No.: 14/481,750

(22) Filed: Sep. 9, 2014

(65) Prior Publication Data

US 2015/0069969 A1    Mar. 12, 2015

Related U.S. Application Data

(60) Provisional application No. 61/875,592, filed on Sep. 9, 2013.

(51) Int. Cl.
*H02J 7/14* (2006.01)
*B60L 9/00* (2006.01)
(Continued)

(52) U.S. Cl.
CPC .......... *H02J 7/0047* (2013.01); *H02J 7/007* (2013.01); *H02J 7/0021* (2013.01);
(Continued)

(58) Field of Classification Search
CPC .................................................. H02J 7/0047
(Continued)

(56) References Cited

U.S. PATENT DOCUMENTS

| 2010/0094496 | A1* | 4/2010 | Hershkovitz | B60L 3/12 701/22 |
| 2011/0225105 | A1 | 9/2011 | Scholer | |
| 2014/0354228 | A1* | 12/2014 | Williams | B60L 11/1844 320/109 |

FOREIGN PATENT DOCUMENTS

| WO | 2011163623 A1 | 12/2011 |
| WO | 2013053413 A1 | 4/2013 |

OTHER PUBLICATIONS

International Application No. PCT/US2014/054829, filed Sep. 9, 2014, Written Opinion of the International Search Authority mailed Mar. 24, 2016.

* cited by examiner

*Primary Examiner* — Richard V Muralidar
(74) *Attorney, Agent, or Firm* — Kunzler Law Group

(57) ABSTRACT

An apparatus for charge management for an electric vehicle is disclosed. A system and method also perform the functions of the apparatus. The apparatus includes a battery status module that displays a battery charge status indicator on an electronic display of an electric device. The battery charge status indicator is for a battery providing power to the electric device. The apparatus includes a charging target module that displays a charging target on the electronic display. The charging target is related to the battery charge status indicator and indicates a desired charge level for the battery. The apparatus includes a target adjustment module that adjusts the charging target based on a predicted next battery charging and battery usage, wherein the battery charging and usage are based on a schedule and/or a planned route.

23 Claims, 9 Drawing Sheets

(51) Int. Cl.
  *H02J 7/00* (2006.01)
  *H02J 7/02* (2016.01)
(52) U.S. Cl.
  CPC .......... *H02J 7/0027* (2013.01); *H02J 7/0052* (2013.01); *H02J 7/025* (2013.01); *Y02T 10/7055* (2013.01)
(58) Field of Classification Search
  USPC .......................................... 701/22; 320/109
  See application file for complete search history.

BATTERY CHARGING GRAPHICAL USER INTERFACE FOR WIRELESS POWER TRANSFER

CROSS-REFERENCES TO RELATED APPLICATIONS

This application claims the benefit of U.S. Provisional Patent Application No. 61/875,592 entitled "BATTERY CHARGING GRAPHICAL USER INTERFACE FOR WIRELESS POWER TRANSFER" and filed on Sep. 9, 2013 for Hunter Wu, et al., which is incorporated herein by reference for all purposes.

FIELD

This invention relates to battery charging and more particularly relates to a display for battery charging.

BACKGROUND

Electric vehicles include batteries that must be charged prior to operation. Wireless battery charging is a method that allows charging of the battery of the vehicle without a direct physical connection of conductors and allows more freedom and quicker charging for electric vehicles. In some instances, a driver may charge a battery without exiting the vehicle. However, to be effective, the driver may want information about the charging process.

SUMMARY

An apparatus for charge management for an electric vehicle is disclosed. A system and method also perform the functions of the apparatus. The apparatus includes a battery status module that displays a battery charge status indicator on an electronic display of an electric device. The battery charge status indicator is for a battery providing power to the electric device. The apparatus includes a charging target module that displays a charging target on the electronic display. The charging target is related to the battery charge status indicator and indicates a desired charge level for the battery. The apparatus includes a target adjustment module that adjusts the charging target based on a predicted next battery charging and battery usage. The battery charging and usage are based on a schedule and/or a planned route.

In one embodiment, the electric vehicle travels along the designated route two or more times before traveling from the final battery charging location to the final destination. In one embodiment, the electronic display includes an electronic display of an electric vehicle and the battery provides power to the electric vehicle. The planned route includes a designated route for the electric vehicle and the battery charges at one or more predefined battery charging locations along a designated route of the electric vehicle. In the embodiment, the target adjustment module adjusts the charging target based on a location of a next battery charging location on the designated route and an amount of battery charge required to complete the designated route a specified number of times and to reach a final destination after a final battery charging location along the designated route. In another embodiment, the battery charge status indicator represents an amount of energy to be used by the electric vehicle prior to reaching the final destination and the charging target represents a target battery charge status at a particular location on the designated route based on a planned number of times for the electric vehicle to traverse the designated route prior to traveling to a final destination. In a further embodiment, the target adjustment module adjusts the charging target at a rate such that the charging target reaches a minimum battery charge status at the final destination.

In one embodiment, the apparatus includes a charging alert indicator module that changes the electronic display to indicate a low charge condition. The low charge condition indicates that a current battery charge status is below a level sufficient for the electric vehicle to reach a next battery charging location and/or the final destination. In another embodiment, the charging alert indicator module changes the electronic display to stop indicating the low charge condition in response to the battery charge status indicator reaching a level indicative of the battery of the electric vehicle having enough energy for the electric vehicle to reach the next battery charging location and/or the final destination. In another embodiment, the charging alert indicator module changes the appearance of the battery charge status indicator from a first state to a second state to indicate the low charge condition and from the second state to the first state when the battery charge status indicator reaches the level indicative of the battery having enough energy for the electric vehicle to reach the next battery charging location and/or the final destination.

In one embodiment, the target adjustment module adjusts the charging target to a lower value to reflect usage of stored battery charge in addition to an amount of energy stored in the battery during battery charging. The lower value represents a battery charge status corresponding to a lower battery charge state than a previous value of the charging target. In another embodiment, the target adjustment module adjusts the charging target to one or more lower values while the electric device uses energy during the schedule and/or travels along the planned route. In another embodiment, the target adjustment module adjusts the charging target to a higher value in response to the electric device reaching a battery charging location and in response to a planned amount of charging at the battery charging location. In another embodiment, the battery status module changes the battery charge status indicator to a higher value in response to a measured amount of battery charging and the battery status module changes the battery charge status indicator to a lower value in response to a measured amount of battery discharging.

In one embodiment, the apparatus includes a charge duration module that indicates on the electronic display a charge time for battery charging at a battery charging location. The charge time indicates an amount of charging so that the battery charge status indicator reaches at least a current charging target value. In a further embodiment, the apparatus includes a catch up module that determines that a current battery charge status is below the charging target lower threshold. The charging target lower threshold is relative to a current charging target. The catch up module increases a charge time, in response to the battery charge status being below the charging target lower threshold, at one or more subsequent battery charging locations to return the battery charge status indicator to a desired battery charge status.

In one embodiment, the battery charge status includes an amount of battery charge within a battery charge status range. The battery charge status range represents an amount of energy for the electric device to travel the planned route and/or an amount of energy for the electric device to operate during the schedule.

A system for battery charge management includes an electric vehicle with a battery that provides power to the electric vehicle. The battery and electric vehicle are configured to allow charging of the battery at a battery charging location on a designated route of travel of the electric vehicle. The system includes an electronic display mounted on the electric vehicle and a battery status module that displays a battery charge status indicator on the electronic display of the electric vehicle. The battery charge status indicator is for the battery. The system includes a charging target module that displays a charging target on the electronic display. The charging target is related to the battery charge status indicator and indicates a desired charge level for the battery. The system includes a target adjustment module that adjusts the charging target based on a location of a next battery charging location on the designated route and an amount of battery charge required to complete the designated route a specified number of times and to reach a final destination after a final battery charging location along the designated route. In one embodiment, the system includes one or more battery chargers located at the battery charging locations.

A method for battery charge management includes displaying a battery charge status indicator on an electronic display of an electric vehicle. The battery charge status indicator is for a battery providing power to the electric vehicle. The battery charges at one or more predefined battery charging locations along a designated route of the vehicle. The method includes displaying a charging target on the electronic display. The charging target is related to the battery charge status indicator and indicating a desired charge level for the battery. The method includes adjusting the charging target based on a location of a next battery charging location on the designated route and an amount of battery charge required to complete the designated route a specified number of times and to reach a final destination after a final battery charging location along the designated route.

In one embodiment, the method includes adjusting the charging target to one or more lower values while the electric vehicle travels along the designated route and adjusting the charging target to a higher value in response to the electric vehicle reaching a battery charging location and in response to a planned amount of charging at the battery charging location. In another embodiment, the method includes changing the battery charge status indicator to a higher value in response to a measured amount of battery charging and changing the battery charge status indicator to a lower value in response to a measured amount of battery discharging. In another embodiment, the method includes indicating on the electronic display a charge time for battery charging at a battery charging location. The charge time indicates an amount of charging so that the battery charge status indicator reaches at least a current charging target value. In a further embodiment, the method includes determining that a current battery charge status is below a desired battery charge status. The desired charge status is relative to a current charging target at a current battery charging location and relative to a desired charging time at the battery charging location. In the embodiment, the method includes increasing a charge time at one or more subsequent battery charging locations to return the battery charge status indicator to a desired battery charge status.

In one embodiment, the method includes changing the electronic display to indicate a low charge condition. The low charge condition indicates that a current battery charge status is below a level sufficient for the electric vehicle to reach a next battery charging location and/or the final destination. In the embodiment, the method also includes changing the electronic display to stop indicating the low charge condition in response to the battery charge status indicator reaching a level indicative of the battery of the electric vehicle having enough energy for the electric vehicle to reach the next battery charging location and/or the final destination.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
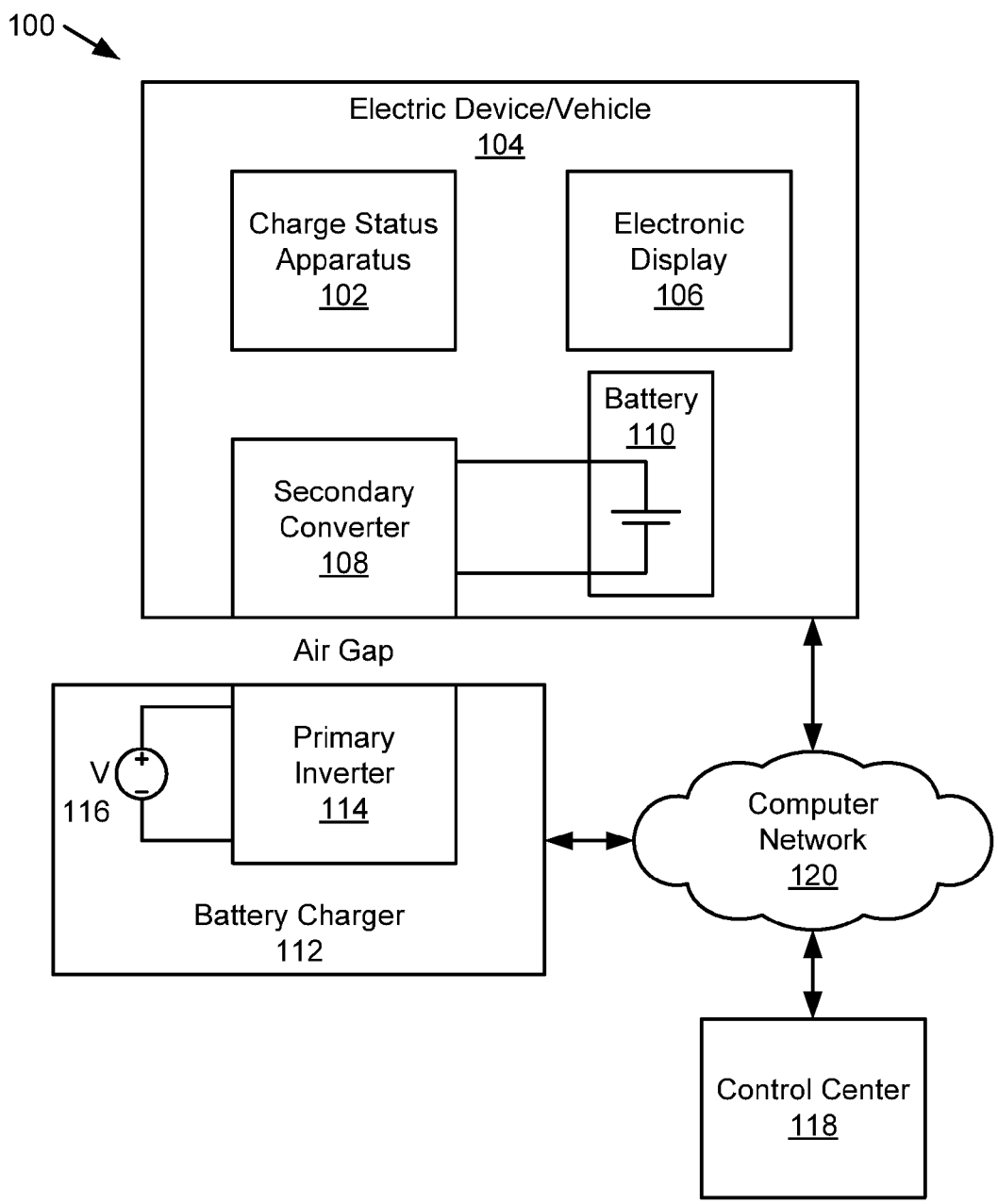
FIG. 1 is a schematic block diagram illustrating one embodiment of a system for managing charging in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating one embodiment of a system 100 for managing charging in accordance with one embodiment of the present invention. The system 100 includes a charge status apparatus 102, an electric device/vehicle 104, an electronic display 106, a secondary converter 108, a battery 110, a battery charger 112, a primary inverter 114, a voltage source 116, a control center 118, and a computer network 120, which are described below. The electric device/vehicle 104 may be an electric device or electric vehicle and electric device 104 and electric vehicle 104 are used interchangeably herein.

Figure 2:
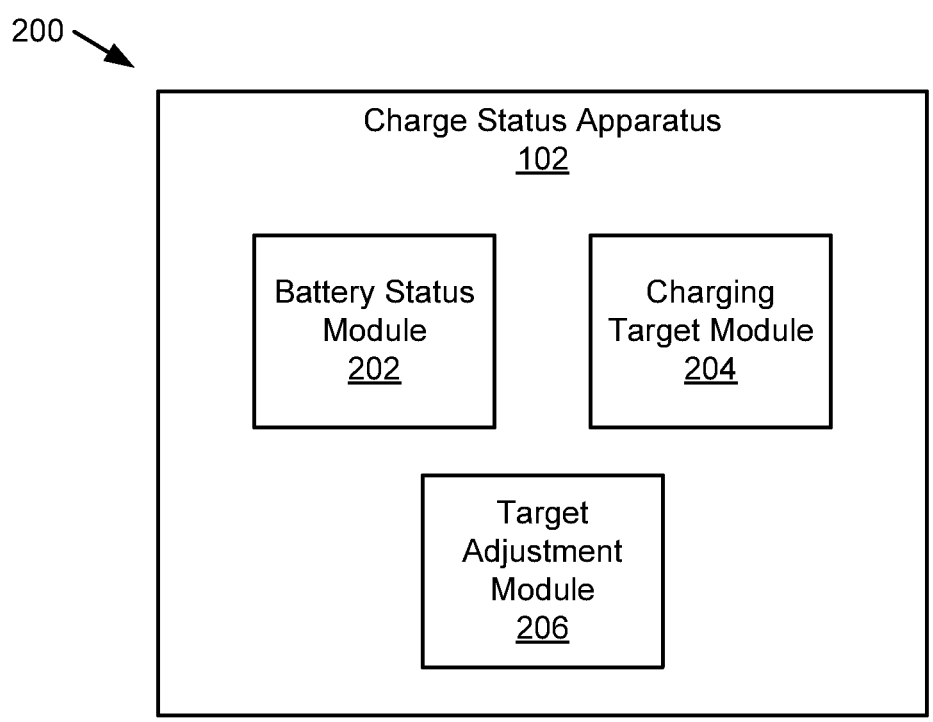
FIG. 2 is a schematic block diagram illustrating one embodiment of an apparatus for managing charging in accordance with one embodiment of the present invention.
Figure 3:
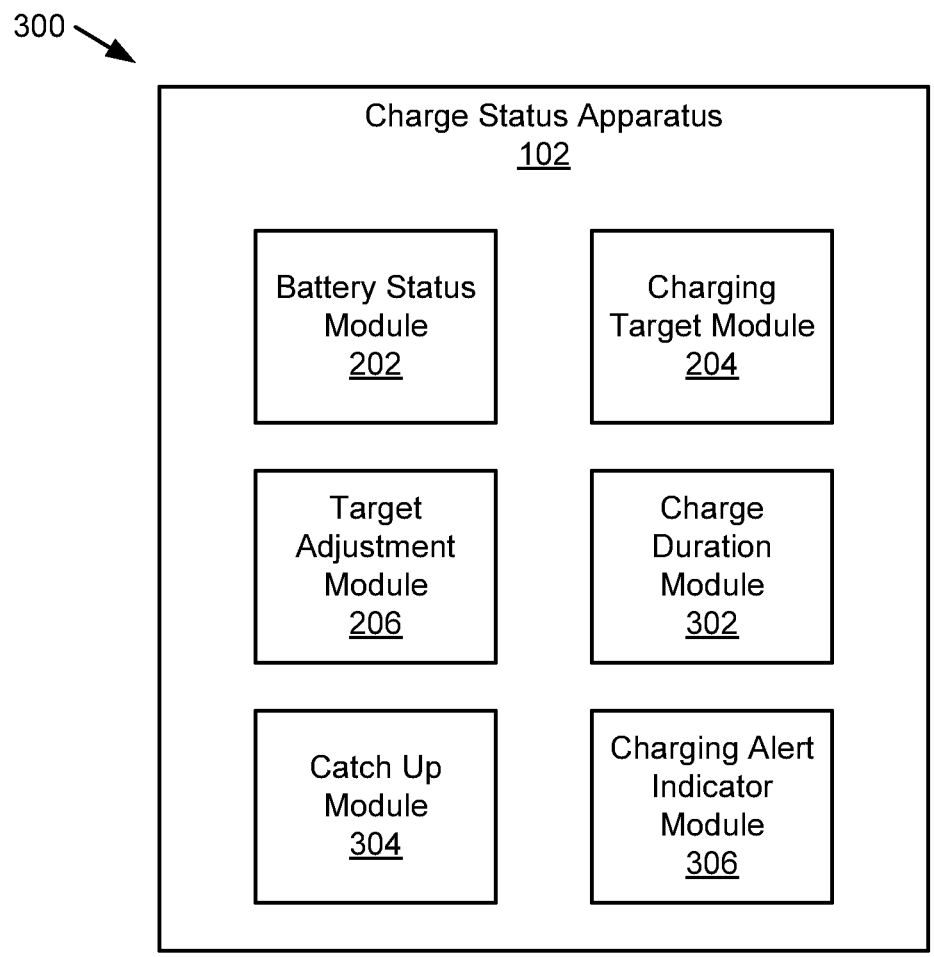
FIG. 3 is a schematic block diagram illustrating one embodiment of another apparatus for managing charging in accordance with one embodiment of the present invention.

The system 100 includes a charge status apparatus 102 that is described in more detail with regard to the apparatuses 200, 300 of FIGS. 2 and 3. The charge status apparatus 102 is included in an electric device/vehicle 104, which also includes an electronic display 106, a secondary converter 108, and a battery 110. The battery 110 provides power to the electric device/vehicle 104. For example, the battery 110 may provide power to an electric motor that may directly or indirectly move the electric vehicle 104. The electric vehicle 104 may include wheels suitable for travel on a road, on tracks, etc. In another embodiment the electric vehicle 104 includes an alternate means of propulsion and suspension, such as magnetic levitation, monorail, etc. In another embodiment, the battery 110 provides power to circuits and equipment of the electric device 104. For example, the electric device 104 may be a cellular phone, such as a smartphone. In another embodiment, the electric device 104 may be a portable piece of electrical equipment, such as a portable power source or other item with a battery 110 that may be charged wirelessly.

In one embodiment, the electric vehicle 104 travels along a designated route and the designated route includes one or more battery charging locations. For example, the electric vehicle 104 may be a bus or other public transportation vehicle that travels along a particular route with bus stops. The bus stops may be battery charging locations. Each battery charging location includes a battery charger 112. In another embodiment, the electric vehicle 104 is a car, delivery van, mail truck, yard hauler, ground support equipment ("GSE"), such as for an airport, a bicycle, etc. and may travel along a designated route with battery charging locations.

In one embodiment, the designated route may include two or more routes. For example, the designated route may include a first designated route for a period of time, maybe one or more times traversing this first designated route, and then a second designated route where the electric vehicle 104 may travel the second designated route a number of times. The designated route may include any combination of routes, battery charging locations, etc. The designated route may be a complex route with varied battery charging locations and charging durations. For an electric device 104 that is not a vehicle, the planned route may be programmed based on a particular schedule, or may be generated based on a pattern of use. For example, a user may have a particular pattern of travel from home to work and back and the schedule and/or planned route may be created electronically based on average wake times, an average time to go to work, average travel times, a typical amount of time at work, a typical bed time, etc. The planned/designated route, schedule, traffic patterns, loading patterns, etc. may be used to create a profile of charging targets, as described below.

In one embodiment, the electric device 104 operates based on a schedule and/or travels along a planned route. For example, where the electric device 104 is a cellular phone, the user of the cellular phone may have a planned route on a typical business day where the user typically removes the phone from a charger, travels to work, leaves work at a planned time, and returns home, and charges the phone at night. The user may have opportunities to charge the phone while in a car, at a desk at work, at home or other typical location. Often charging time during a work day may be insufficient to return the battery 110 of the phone to a fully charged state.

The battery chargers 112, in one embodiment, provide partial charging to the battery 110. For example, the battery 110 may be fully charged at an initial location or may be charged to a level sufficient to travel the planned/designated route one or more times and reach the final destination with partial charging of the battery 110 at the battery charging locations on the planned/designated route. In one embodiment the final destination is a final battery charging location on the planned/designated route. In another embodiment, the final destination and starting location are apart from battery charging locations on the planned/designated route. For example, the staring location and final location are a bus storage facility. In one embodiment, the battery 110 supplements battery charging at the battery charging locations so that the electric device/vehicle 104 does not have to remain at a battery charge location for a time sufficient to fully charge the battery 110. For example, where the electric vehicle 104 is a bus, battery charging during a typical bus stop time period may be insufficient for the bus to continue throughout a typical operational period of a day and the battery 110 may be designed with extra capacity to supplement the partial charging at the bus stops (i.e. battery charging locations). Where the electric device 104 is a cellular phone, charging in a car, at work, etc. may be insufficient to fully charge the battery 110.

The electric device/vehicle 104, in one embodiment, includes a secondary converter 108 that receives power from the battery charger 112 and conditions the power for charging the battery 110. In one example, the secondary converter 108 includes a secondary receiver pad that receives power wirelessly from the battery charger 112. In the embodiment, the battery charger 112 may include a primary inverter 114 with a primary receiver pad that receives energy from a voltage source 116 and conditions power received from the voltage source 116 to be transmitted via the primary receiver pad wirelessly to the secondary receiver pad of the secondary converter 108. The system 100, in the embodiment, may be a wireless power transfer ("WPT") system and may be as described in U.S. patent application Ser. No. 13/748,269, filed Jan. 23, 2013 for Hunter Wu, et al, titled "Wireless Power Transfer System," [hereinafter "'269 application"] which is incorporated herein by reference in its entirety for all purposes.

For example, the WPT system may include a primary inverter 114 of an inductive power transfer ("IPT") system. The primary inverter 114 may include an LCL load resonant converter with a switching section, an LCL tuning circuit, a primary receiver pad, and a primary controller, where the switching section connects a direct current ("DC") voltage to the LCL tuning circuit. The switching section connects the DC voltage in a positive polarity and in a negative polarity during a switching cycle of the switching section. Typically the switching section switches at a particular frequency and the LCL tuning circuit has a resonant frequency that is similar or the same as the switching frequency so that the switching section and the LCL tuning circuit produce an alternating current ("AC") frequency. The primary receiver pad is connects as a load to the LCL tuning circuit and the primary controller controls switching in the switching section. The AC frequency is transferred to the primary receiver pad where the primary receiver pad generates an electromagnetic waveform.

The WPT system may include, in one embodiment, a secondary converter 108 of the IPT system where the secondary converter 108 includes a secondary receiver pad, a secondary resonant circuit, a secondary rectification circuit, a secondary decoupling converter, and a secondary decoupling controller. The secondary receiver pad connects to the secondary resonant circuit and the secondary resonant circuit connects to the secondary rectification circuit. The secondary rectification circuit connects to the secondary decoupling converter and the secondary decoupling controller controls switching in the secondary decoupling converter. The WPT system includes a load connected to the IPT system in the form of a battery 110 that connects to an output of the secondary converter 108. The primary receiver pad wirelessly transfers power to the secondary receiver pad across a gap when the vehicle positions the secondary receiver pad with respect to the primary receiver pad. The gap may include an air gap.

The primary and secondary receiver pads, in one embodiment, are electromagnetically coupled when the secondary receiver pad is positioned over the primary receiver pad. Typically the primary receiver pad and secondary receiver pad have a highest degree of coupling when aligned and have the coupling is reduced as alignment is reduced. The secondary receiver pad has an AC waveform induced from the primary receiver pad, which typically includes the frequency generated by the switching section and the LCL tuning circuit and may also include other harmonic frequencies. The secondary resonant circuit is designed for the AC waveform and to work in conjunction with the secondary receiver pad impedances and primary side impedances. The secondary rectification circuit rectifies the AC waveform in the secondary resonant circuit and the secondary decoupling converter receives a DC waveform from the secondary rectification circuit and typically provides a regulated voltage to the battery 110. The secondary decoupling converter typically controls charging of the battery 110. The WPT system may be as described in the '269 application.

In one embodiment, the primary inverter 114 receives power from a voltage source 116. In another embodiment, the primary inverter 114 receives power from a battery. The battery charger 112 may be stationary or may be movable. For example, the primary inverter 114 may be mobile charger that may be moved or may be taken to an electric device/vehicle 104. For instance, where an electric vehicle 104 runs out of power, a mobile battery charger 112 may be taken to the electric vehicle 104, for example on another vehicle, to provide charge to the electric vehicle 104. In another embodiment, the battery charger 112 may be mobile and may be plugged into a receptacle or may receive power from another source.

In another embodiment, the secondary converter 108 receives power using wires. For example, the secondary converter 108 may be plugged in at a battery charging location and may receive power through a power cord and receptacle. The electric vehicle 104 may include a receptacle and the battery charger 112 may include a cord and plug. In another embodiment, the battery charger 112 includes exposed conductors that touch a particular location of the secondary converter 108 and may includes springs or other devices to move the conductors into contact with the secondary converter 108. One of skill in the art will recognize other ways for the battery charger 112 to transfer power to the secondary converter 108.

In one embodiment, the electric vehicle 104 includes an electronic display 106. The charge status apparatus 102 uses the electronic display 106 to communicate information regarding battery charging to a user. For example, the electronic display 106 may be part of a dashboard. In another embodiment, the electronic display 106 is located near a location of a receptacle for charging, such as on an exterior of the electric vehicle 104. In another embodiment, the charge status apparatus 102 communicates charging information without or independent of an electronic display 106.

In one embodiment, the system 100 may include a control center 118 connected over a computer network 120. The control center 118 may connect to the electric device/vehicle 104, electronic display 106, battery chargers 112, etc. over the computer network 120. The computer network 120 may be a wireless network, a local area network, an optical fiber network, or any other computer network 120 known in the art. The control center 118 may have remote monitoring and control capabilities. For example, for a group of electric devices/vehicles 104, a control center may be able to manage the various electric devices/vehicles 104 and may be able to provide alerts, make adjustments, etc. One of skill in the art will recognize other ways that the control center 118 may control and interact with the system 100.

FIG. 2 is a schematic block diagram illustrating one embodiment of an apparatus 200 for managing charging in accordance with one embodiment of the present invention. The apparatus 200 includes one embodiment of the charge status apparatus 102 with a battery status module 202, a charging target module 204, and a target adjustment module 206, which are described below.

The apparatus 200 includes, in one embodiment, a battery status module 202 that displays a battery charge status indicator on the electronic display 106 of the electric vehicle 104. The battery charge status indicator is for the battery 110 that is providing power to the electric vehicle 104. The battery 110 is charged at one or more predefined battery charging locations along a designated route of the electric vehicle 104. In one embodiment, the represents an amount of energy to be used by the electric vehicle 104 prior to reaching the final destination.

For example, the battery charge status may represent an amount of battery charge within a battery charge status range. The battery charge status range may represents an amount of energy for the electric vehicle 104 to travel from a starting location to the designated route, for the electric vehicle 104 to traverse the designated route for a planned number of times while stopping at each battery charging location on the designated route and charging for a predetermined amount of time, and for the electric vehicle to travel to the final destination. The battery charge status range may not represent a total range of battery charge, but may represent a subset of battery charge used on the designated route. The battery charge status range may change when the electric vehicle 104 is to use a different designated route. For example, the charge status apparatus 102 may be programmed with a route, a starting location, a final destination, number of times to travel the designated route, a schedule, etc. and the charge status apparatus 102 may calibrate the battery charge status range based on this information.

In another embodiment, the battery charge status range is for an electric device 104 used throughout a day and includes a planned amount of energy used in typical activities, such as phone calls, internet usage, text messaging, etc. The electric device 104 may also be any device that includes a battery 110 and uses battery power and can be charged during a schedule. In particular, the electric device 104 includes devices where actual battery usage differs from planned usage and the apparatus 200 may be used to indicate when the actual usage is higher than planned usage so that a user can take steps to increase charging, decrease usage, etc.

The charge status apparatus 102 may also set a battery charge time for each battery charging location. The battery charge time may be set based on a distance to a next battery charging station, a maximum allowable stop time, traffic, and the like. In one embodiment, the battery status module 202 changes the battery charge status indicator to a higher value in response to a measured amount of battery charging. In another embodiment, the battery status module 202 changes the battery charge status indicator to a lower value in response to a measured amount of battery discharging.

In one embodiment, the apparatus 200 includes a charging target module 204 that displays a charging target on the electronic display 106. The charging target is related to the battery charge status indicator and indicates a desired charge level for the battery 110. The charging target module 204 sets the charging target based a planned route of the electric vehicle 104 and planned charging times. The apparatus 200 also includes a target adjustment module 206 that adjusts the charging target based on a location of a next battery charging location on the designated route and an amount of battery charge required to complete the designated route a specified number of times and to reach a final destination after a final battery charging location along the designated route.

In one embodiment, the target adjustment module 206 adjusts the charging target to a lower value to reflect usage of stored battery charge in addition to an amount of energy stored in the battery 110 at a battery charging location. The lower value represents a battery charge status corresponding to a lower battery charge state than a previous value of the charging target. For example, where the battery charge status indicator is planned to go from a maximum level to a minimum level as the electric vehicle 104 travels the designated route, the target adjustment module 206 may adjust the charging target to a lower value throughout the designated route to represent a planned reduction of battery charge throughout the designated route.

In one embodiment, the charging target represents a target battery charge status at a particular location on the designated route based on a planned number of times for the electric vehicle 104 to traverse the designated route prior to traveling to a final destination. In one embodiment, the target adjustment module 206 adjusts the charging target at a rate such that the charging target reaches a minimum battery charge status at the final destination. The target adjustment module 206 adjusts the charging target to one or more lower values while the electric vehicle 104 travels along the designated route.

For example, a minimum charge for the battery 110 may be 20 percent ("%") and the electric vehicle 104 may start traversing a route with a battery charge of 100%. The planned route may include four stops, each with a battery charger 112 and the electric vehicle may discharge the battery 30% between the planned stops. At the first stop, the battery may then be charged to 70%. The charging target module 204 may initially display a charging target on the electronic display 106 of 100%. At the first stop, the target adjustment module 206 may adjust the charging target from 100% to 80% so that at the first stop the battery charger 112 is engaged to charge the battery 10% to get to the desired 80%. The planned route may be such that the battery 110 should be at 80% at the first stop, 60% at the second stop, 40% at the third stop, and 20% at the final stop. At the next stop the target adjustment module 206 may adjust the charging target to 60%. If the driver takes an alternate route, the target adjustment module 206 may further adjust the charging target based on the new route.

FIG. 3 is a schematic block diagram illustrating one embodiment of another apparatus 300 for managing charging in accordance with one embodiment of the present invention. The apparatus 300 includes another embodiment of the charge status apparatus 102 with a battery status module 202, a charging target module 204, and a target adjustment module 206, which are substantially similar to those described in relation to the apparatus 200 of FIG. 2. In various embodiments, the apparatus 300 includes a charge duration module 302, a catch up module 304, and a charging alert indicator module 306, which are described below.

In one embodiment, the apparatus 300 includes a charge duration module 302 that indicates on the electronic display 106 a charge time for battery charging at a battery charging location. The charge time indicates an amount of charging so that the battery charge status indicator reaches at least a current charging target value. In one embodiment, the charge duration is a planned charge duration based on a distance to a next battery charging location, traffic, etc. Traffic delays, weather, unforeseen stops, and other factors may cause the battery 110 to be discharged more than a planned amount. For example, traffic impeding movement of the electric vehicle 104 may cause an unplanned usage of battery energy. In another embodiment, a malfunction may cause a higher than usual usage of battery energy. In another embodiment, a flat tire due to road debris may cause battery energy to be different than planned. Another factor that might cause battery usage variations is varying loading conditions. For example, a higher than expected number of passengers may cause additional power usage. Weather may also cause varied power usage or may reduce available battery power. Other conditions may also cause unplanned battery usage and may cause the battery charge status indicator to be less than a current charging target. In this case the battery status module 202 may display the battery charge status indicator at a level that is below a current charge target.

In one embodiment, the charge duration module 302 adjusts the charge duration to accommodate a battery charge status below the charging target. In another embodiment, where the battery charge status is too low to be corrected at one battery charging location, the apparatus 300 includes a catch up module 304 that determines that a current battery charge status is below a charging target lower threshold. The charging target lower threshold is relative to a current charging target. The catch up module 304, in one embodiment, increases a charge time in response to the battery charge status being below the charging target lower threshold, at one or more subsequent battery charging locations to return the battery charge status indicator to a desired battery charge status.

For example, if the battery charge status indicator indicates a battery status where a charge duration to reach a current charging target is 10 minutes and it is undesirable to stop at a current battery charge location for 10 minutes, the catch up module 304 may add charge time to the current and subsequent battery charge locations. For instance, if a maximum stop duration is 4 minutes and a typical charge duration is 2 minutes, the catch up module 304 may add 2 minutes to a current battery charging location and to two additional battery charging locations to bring the battery charge status indicator to a current charging target. In another embodiment where the battery charge status indicator is above a current charging target, the charge duration module 302 may decrease one or more charge durations.

In one embodiment, the apparatus 300 includes a charging alert indicator module 306 that changes the electronic display 106 to indicate a low charge condition. The low charge condition indicates that a current battery charge status is below a level sufficient for the electric vehicle 104 to reach a next battery charging location and/or the final destination. An operator of the electric vehicle 104 may then be alerted to the low charge condition and may permit a longer charge to ensure reaching the next battery charging location or final destination, or may choose an alternate route to the final destination. For example, the electric vehicle 104 may skip planned stops and may travel directly to the final destination over shorter than planned route. In one embodiment, the charging alert indicator module 306 changes the electronic display 106 to stop indicating the low charge condition in response to the battery charge status indicator reaching a level indicative of the battery 110 of the electric vehicle 104 having enough energy for the electric vehicle 104 to reach the next battery charging location or the final destination. Changing the electronic display 106 to stop indicating the low charge condition may alert the operator that charging is sufficient to reach the next battery charging location or the final destination.

In one embodiment, the charging alert indicator module 306 changes the appearance of the battery charge status indicator from a first state to a second state to indicate the low charge condition and from the second state to the first state when the battery charge status indicator reaches the level indicative of the battery having enough energy for the electric vehicle to reach the next battery charging location or the final destination. For example, the charging alert indicator module 306 may change the battery charge status indicator from green to red or to a flashing red to indicate the low charge condition and back to green to stop indicating the low charge condition.

Figure 4:
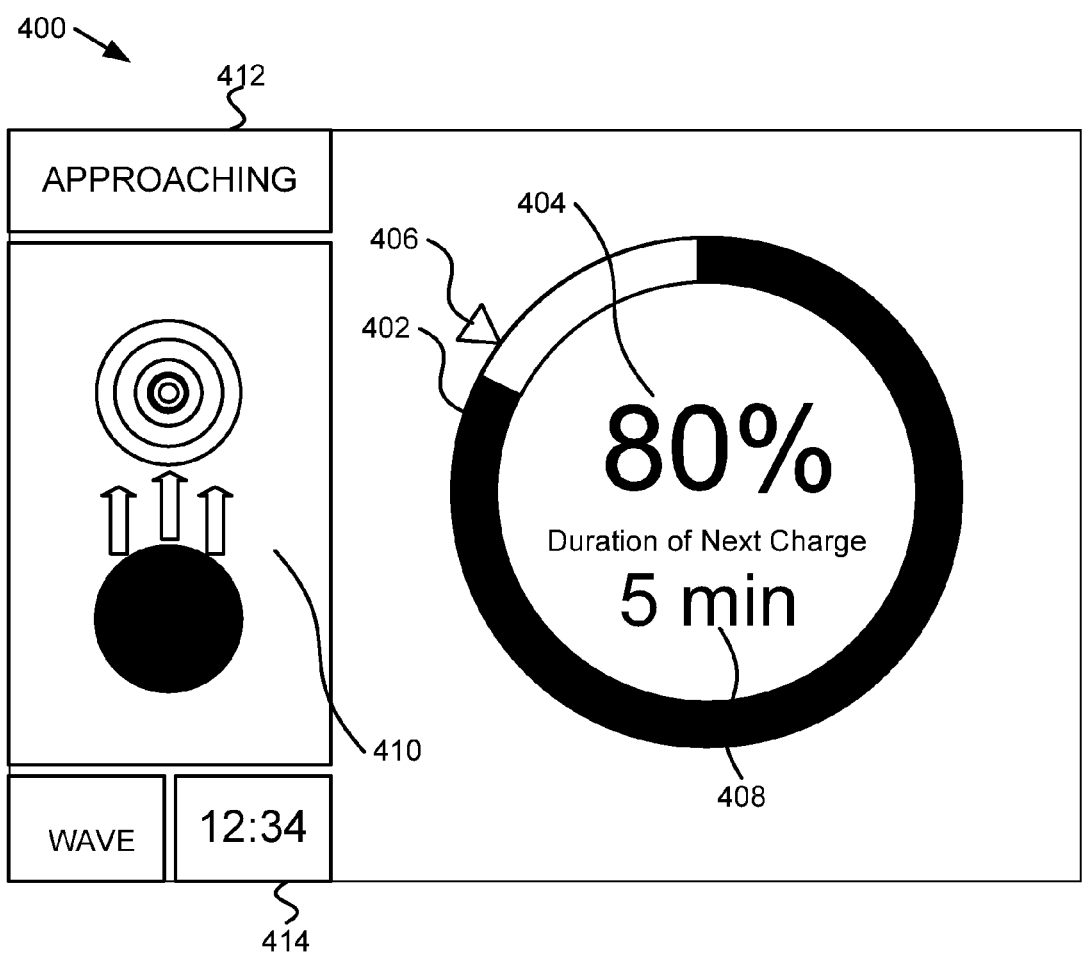
FIG. 4 is a one embodiment of a graphical user interface for managing wireless power transfer in accordance with one embodiment of the present invention.

FIG. 4 is a one embodiment of a graphical user interface 400 for managing wireless power transfer in accordance with one embodiment of the present invention. The graphical user interface ("GUI") 400 includes a battery charge status indicator 402 in the form of a circle where battery charge status is green and the amount of green indicates battery charge status. For example, the battery charge status indicator 402 may start at all gray to represent a minim charge level, may have some green at a top of the circle for a small amount of battery charge, and may increase an amount of green in a clockwise direction for increasing battery charge, and may be fully green for a maximum battery charge condition. Note that the maximum battery charge condition may indicate an amount of charge required for the electric vehicle 104 to travel the designated route a planned number of times and to reach the final destination and may or may not correlate with a full battery charge. The GUI 400 may also include a different form of the battery charge status indicator, such as a percentage 404. In one embodiment, the GUI 400 includes a charging target 406 in the form of an arrow on the graphical battery charge status indicator 402. In another embodiment, the GUI 400 includes a charge duration 408 in the form of written text to indicate a charge time. The charge duration 408, in one embodiment, is in the form of a timer that starts decrementing when battery charging begins.

In one embodiment, the GUI 400 includes a graphical symbol 410 that indicates approach, alignment, etc. of the electric vehicle 104 with respect to the battery charger 112. In another embodiment, the GUI 400 includes text 412 that indicates the approach and alignment status, or other status. For example, the text 412 may include a driving status, a charging status, etc. Other text 412 is described in FIG. 5. The GUI 400 may also include a clock 414 or other pertinent information. In other embodiments, the GUI 400 may include battery charge status indicators 402, 404, a charging target 406, a charge duration 408, etc. in different forms. One of skill in the art will recognize other ways to display a battery charge status indicator 402, 404, a charging target 406, a charge duration 408, etc.

Figure 5:
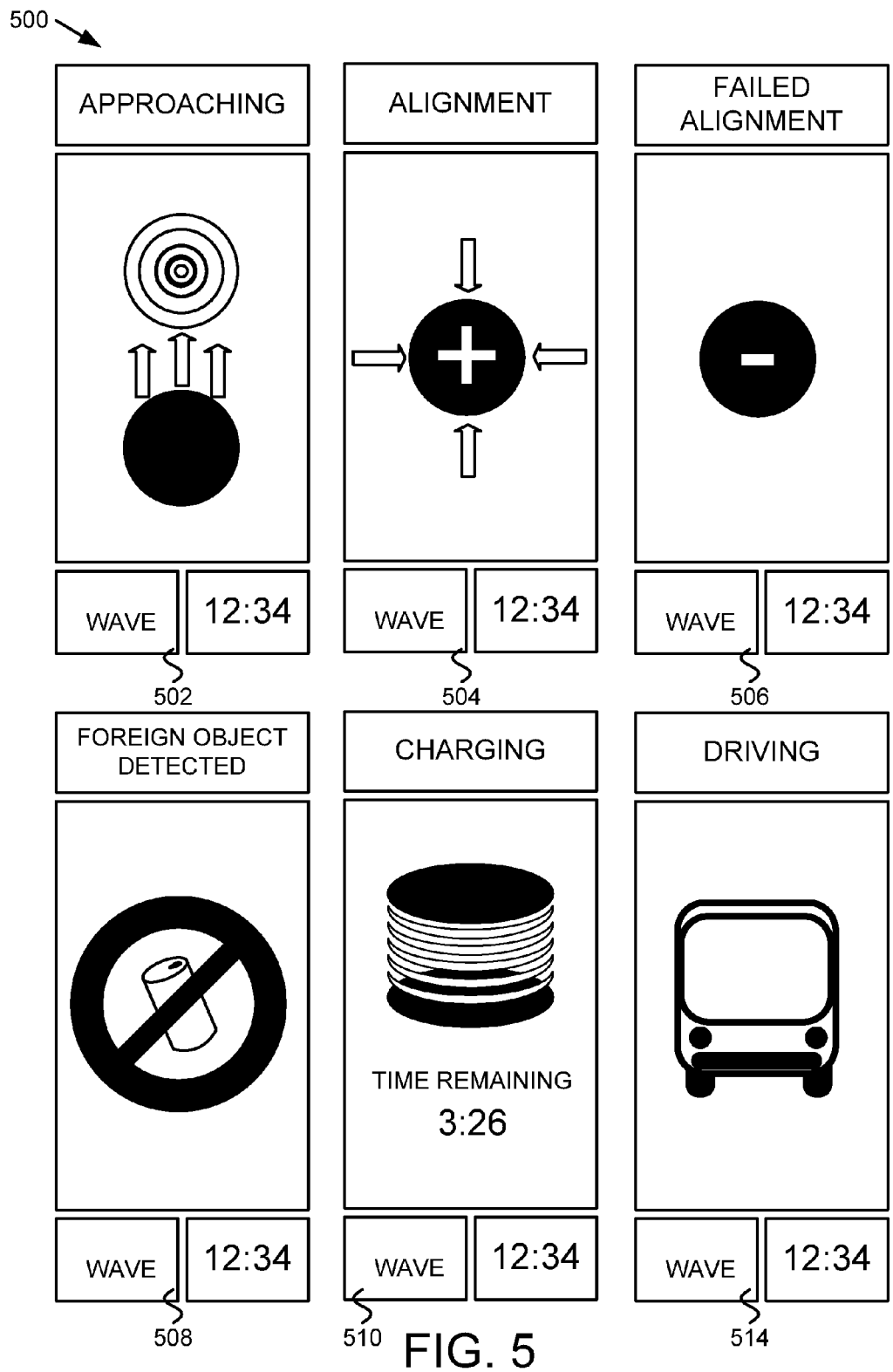
FIG. 5 is a depiction of several embodiments of symbols used for managing wireless power transfer in accordance with one embodiment of the present invention.

FIG. 5 is a depiction of several embodiments of symbols used for managing wireless power transfer in accordance with one embodiment of the present invention. The symbols may be used in the GUI 400 of FIG. 4. The first symbol 502 indicates that the electric vehicle 104 is approaching alignment of the primary receiver pad and the secondary receiver pad, or other battery charging mechanism, depending on the charging system. The second symbol 504 indicates alignment, the third symbol 506 indicates a failed alignment, and the fourth symbol 508 indicates sensing a foreign object between the primary receiver pad and secondary receiver pad. The fifth symbol 510 includes a battery charging symbol and a timer indicating an amount of time remaining for charging. The sixth symbol 512 indicates that the electric vehicle 514 is driving, or is otherwise not at a battery charging location or at least near an alignment condition. Other displays and symbols may also be used. For example, the symbols of FIG. 5 may be shown to the left in the GUI of FIG. 4 and other information may be displayed on the right side of FIG. 4 other than or in addition to the battery charge status indicator 402, the percentage 404, the charging target 406, and the charge duration 408. For instance, the display may include a low battery warning, a failure notification, a message from another party, such as personnel at a main office, and the like. One of skill in the art will recognize other symbols appropriate for a GUI 400 for an electronic display 106 of an electric vehicle 104 to communicate battery charging information and other information for display.

Figure 6:
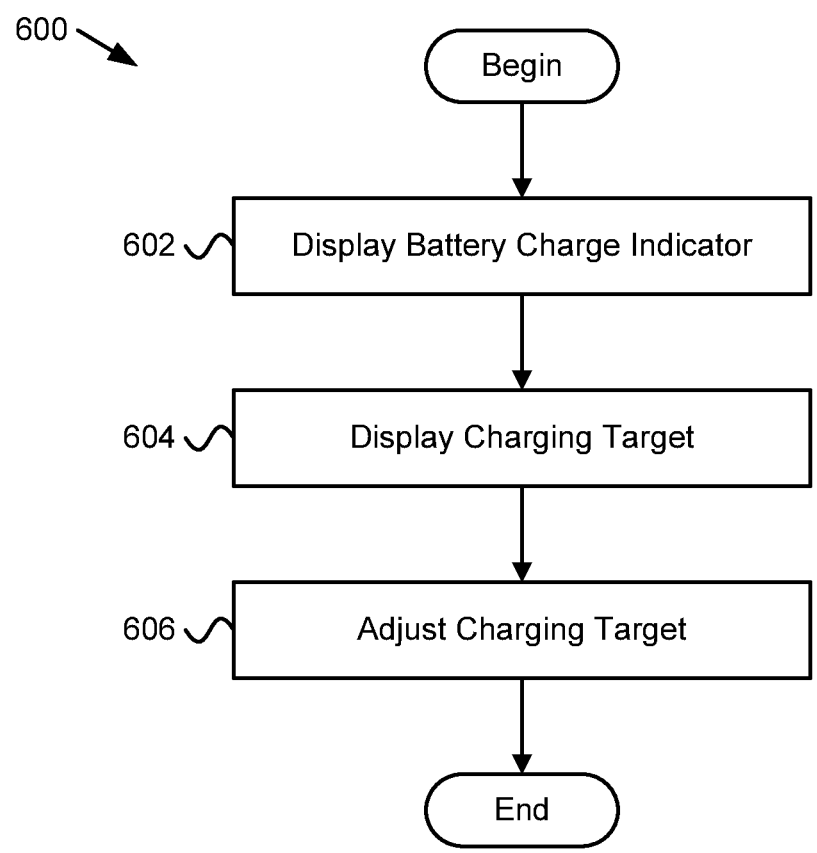
FIG. 6 is a schematic flowchart diagram illustrating one embodiment of a method for managing charging in accordance with one embodiment of the present invention.

FIG. 6 is a schematic flowchart diagram illustrating one embodiment of a method 600 for managing charging in accordance with one embodiment of the present invention. The method 600 begins and displays 602 a battery charge status indicator on an electronic display 106 of an electric vehicle 104. The battery charge status indicator is for a battery 110 that provides power to the electric vehicle 104. The battery 110 charges at one or more predefined battery charging locations along a designated route of the vehicle 104. The battery charge status indicator may be similar to the battery charge status indicators 402, 404 of the GUI 400 of FIG. 4. The battery status module 202 may display 602 the battery charge status indicator.

The method 600 also displays 604 a charging target on the electronic display 106. The charging target is related to the battery charge status indicator and indicates a desired charge level for the battery 110. The charging target, in one embodiment, is a desired charge level for the battery 110 based on the electric vehicle 104 traveling on the designated route a planned number of times. The method 600 adjusts 606 the charging target based on a location of a next battery charging location on the designated route and an amount of battery charge required to complete the designated route a specified number of times and to reach a final destination after a final battery charging location along the designated route, and the method 600 ends.

Figure 7A:
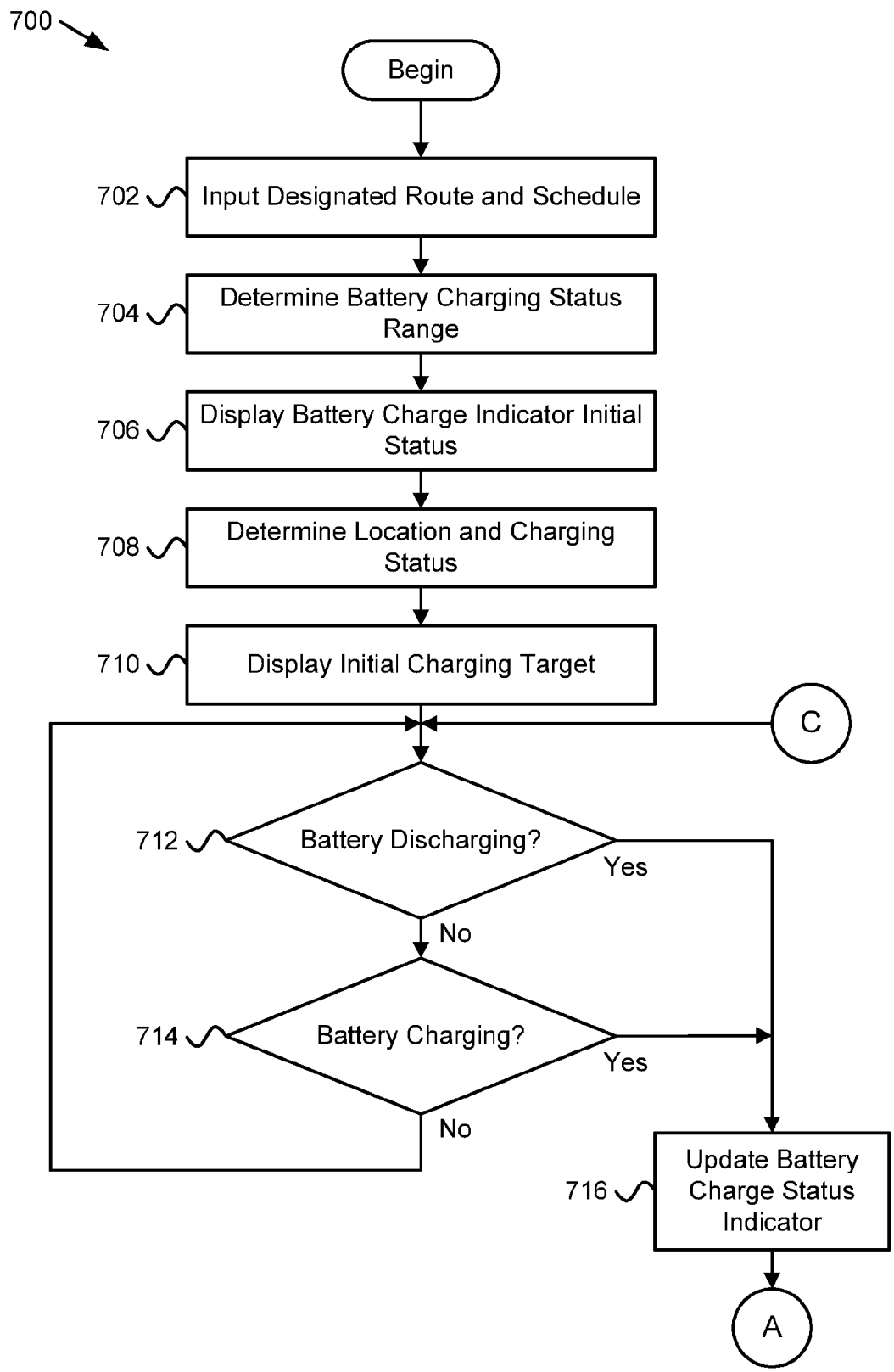
FIG. 7A is a first part of a schematic flowchart diagram illustrating one embodiment of a method for managing charging in accordance with one embodiment of the present invention.
Figure 7B:
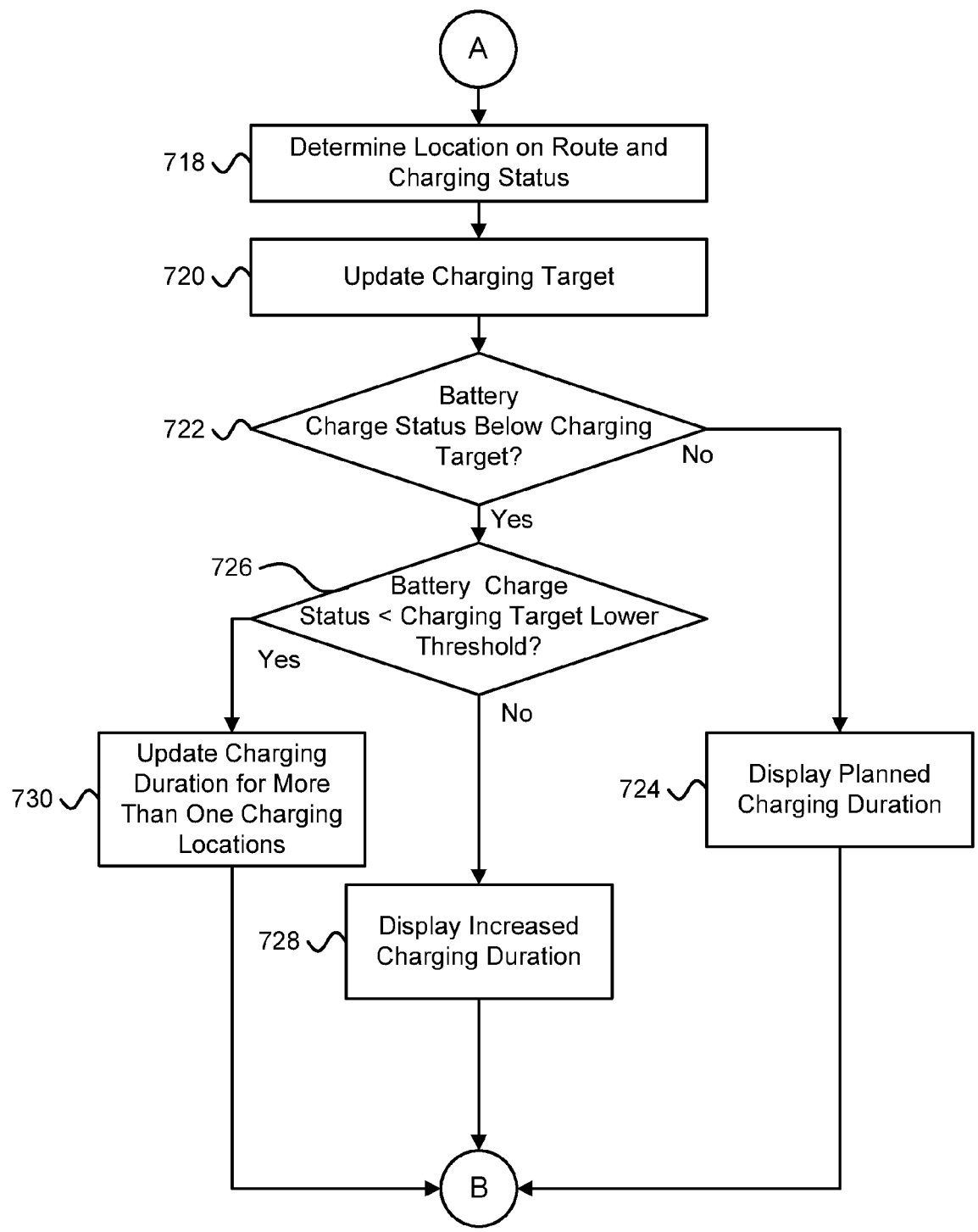
FIG. 7B is a second part of a schematic flowchart diagram illustrating one embodiment of a method for managing charging in accordance with one embodiment of the present invention.
Figure 7C:
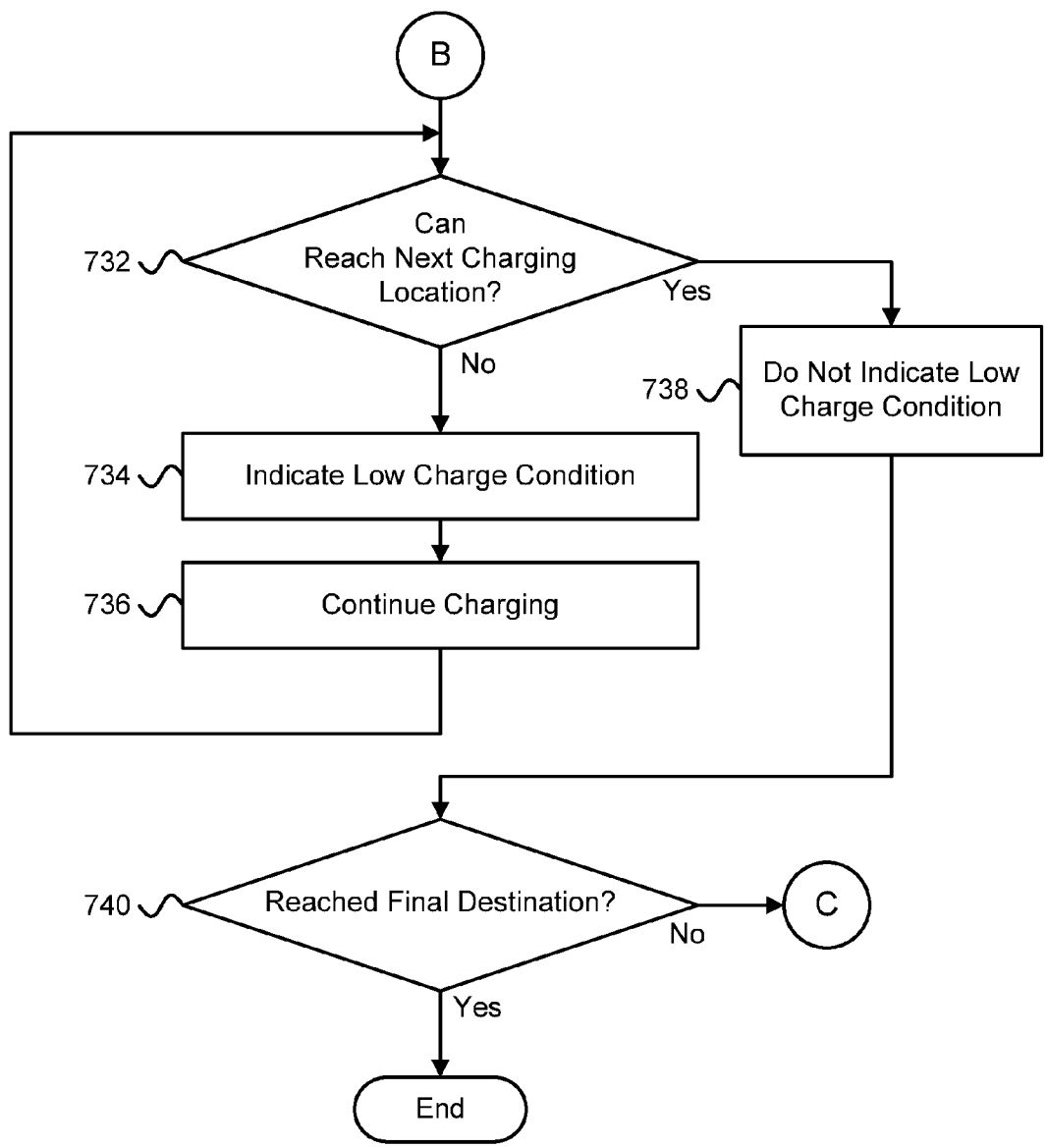
FIG. 7C is a third part of a schematic flowchart diagram illustrating one embodiment of a method for managing charging in accordance with one embodiment of the present invention.

FIGS. 7A, 7B, and 7C are a first, second, and third part of a schematic flowchart diagram illustrating one embodiment of a method 700 for managing charging in accordance with one embodiment of the present invention. The method 700 begins and inputs 702 a designated route and schedule. The designated route is a route that the electric vehicle will travel and the schedule indicates a number of times the electric vehicle 104 will travel the designated route before traveling to a final destination. The schedule may also include information such as timing of stops, predicted traffic, predicted travel times, amount of battery charging at predefined charging locations, etc. The schedule may include any information that would facilitate prediction of battery charge status throughout the schedule.

The method 700 determines 704 a battery charge status range. The battery charge status range, in one embodiment, represents an amount of energy for the electric vehicle 104 to travel from a starting location to the designated route, for the electric vehicle 104 to traverse the designated route for a planned number of times while stopping at each battery charging location on the designated route and charging for a predetermined amount of time, and for the electric vehicle 104 to travel to the final destination. The battery charge status range, in one example, includes a planned amount of energy usage during the schedule, including planned battery charging at the predefined battery charging locations where the charging at the predefined charging locations does not supply all of the energy required by the electric vehicle to travel the designated route.

The method 700 displays 706 an initial status of the battery charge status indicator. For example, the battery status module 202 may display 706 the initial status of the battery charge status indicator. In one embodiment, the method 700 determines a location of the electric vehicle 104 and a charging status of the battery 110 and the method 700 displays 710 an initial charging target. For instance the charging target module 204 may display 710 the initial charging target. The method 700 determines 712 if the battery 110 is discharging. If the method 700 determines 712 that the battery 110 is not discharging, the method 700 determines 714 if the battery 110 is charging. If the method 700 determines 712, 714 that the battery 110 is discharging or charging, the method 700 updates 716 the battery charge status indicator. The battery status module 202 may update 716 the battery charge status indicator. If the method 700 determines 712, 714 that the battery 110 is not charging or discharging, the method 700 returns to determine 712, 714 if the battery 110 is charging or discharging.

The method 700 determines 718 an updated location and battery charge status (follow "A" on FIG. 7A to "A" on FIG. 7B) and displays 720 an updated charging target. The target adjustment module 206 may display 720 an updated charging target. The method 700 determines 722 if the battery charge status indicator is below the charging target. If the method 700 determines 722 that the battery charge status indicator is not below the charging target, the charging target, the method 700 displays 724 a planned charging duration. For example, the charge duration module 302 may display the planned charging duration. If the method 700 determines 722 that the battery charge status indicator is below the charging target, the method 700 determines 726 if the battery charge status indicator is below a charging target lower threshold. If the method 700 determines 726 that the battery charge status indicator is not below a charging target lower threshold, the method 700 displays 728 an increased charging duration. For example, the charge duration module 302 may display a charging duration that is higher than a planned charging duration.

If the method 700 determines 726 that the battery charge status indicator is below a charging target lower threshold, the method 700 updates 730 a charging duration for more than one charging location. For example, the catch up module 304 may determine 726 that the battery charge status indicator is below a charging target lower threshold and may update 730 a charging duration for more than one charging location. The catch up module 304 may determine that the battery charge status indicator is far enough below the charging target that the charge duration module 302 cannot increase the charging duration enough to bring the battery charge status indicator up to the charging target at one battery charging location, the catch up module 304 spreads increased charging duration over two or more battery charging locations.

The method 700 determines 732 (follow "B" on FIG. 7B to "B" on FIG. 7C) if the battery charge status is low enough that the electric vehicle 104 does not have enough energy to reach a next battery charging location and/or the final destination, the method 700 indicates 734 a low charge condition and continues 736 charging the battery 110, if at a battery charging location, and returns to determine 732 if the battery charge status is low enough that the electric vehicle 104 does not have enough energy to reach a next battery charging location and/or the final destination. If the method 700 determines 732 that the battery charge status is not low enough that the electric vehicle 104 does not have enough energy to reach a next battery charging location and/or the final destination, the method 700 does not indicate 738 the low charge condition.

For example, the charging alert indicator module 306 may determine 732 if the battery charge status is low enough that the electric vehicle 104 does not have enough energy to reach a next battery charging location and/or the final destination and may indicate or not indicate the low charging condition. For example, the charging alert indicator module 306 may change the battery charge status indicator 402 in the GUI 400 of FIG. 4 to flash red instead of being green to indicate a low charge condition and may change a flashing red battery charge status indicator back to green to not indicate a low charge condition.

The method 700 determines 740 if the electric vehicle 104 has reached the final destination. If the method 700 determines 740 that the electric vehicle 104 has not reached the final destination, the method 700 returns and determines 712, 714 (follow "C" on FIG. 7C to "C" on FIG. 7A) if the battery 110 is charging or discharging. If the method 700 determines 740 that the electric vehicle 104 has reached the final destination, the method 700 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a battery status module that displays a battery charge status indicator on an electronic display of an electric device, the battery charge status indicator for a battery providing power to the electric device;
    a charging target module that displays a charging target on the electronic display, the charging target related to the battery charge status indicator and indicating a desired charge level for the battery; and
    a target adjustment module that adjusts the charging target based on a predicted next battery charging and battery usage, wherein the battery charging and usage are based on one or more of a schedule and a planned route,
    wherein at least a portion of the battery status module, the charging target module, and the target adjustment module comprise one or more of hardware and executable code, the executable code stored on one or more computer readable storage media.

2. The apparatus of claim 1, wherein:
    the electronic display comprises an electronic display of an electric vehicle and the battery provides power to the electric vehicle, the planned route comprises a designated route for the electric vehicle, and the battery charges at one or more predefined battery charging locations along a designated route of the electric vehicle; and
    the target adjustment module adjusts the charging target based on a location of a next battery charging location on the designated route and an amount of battery charge required to complete the designated route a specified number of times and to reach a final destination after a final battery charging location along the designated route,
    wherein at least a portion of the battery status module, the charging target module, and the target adjustment module comprise one or more of hardware and executable code, the executable code stored on one or more computer readable storage media.

3. The apparatus of claim 2, wherein the electric vehicle travels along the designated route two or more times before traveling from the final battery charging location to the final destination.

4. The apparatus of claim 2, wherein the battery charge status indicator represents an amount of energy to be used by the electric vehicle prior to reaching the final destination and wherein the charging target represents a target battery charge status at a particular location on the designated route based on a planned number of times for the electric vehicle to traverse the designated route prior to traveling to a final destination.

5. The apparatus of claim 4, wherein the target adjustment module adjusts the charging target at a rate wherein the charging target reaches a minimum battery charge status at the final destination.

6. The apparatus of claim 2, further comprising a charging alert indicator module that changes the electronic display to indicate a low charge condition, the low charge condition indicating that a current battery charge status is below a level sufficient for the electric vehicle to reach one or more of a next battery charging location and the final destination.

7. The apparatus of claim 6, wherein the charging alert indicator module changes the electronic display to stop indicating the low charge condition in response to the battery charge status indicator reaching a level indicative of the battery of the electric vehicle having enough energy for the electric vehicle to reach one or more of the next battery charging location and the final destination.

8. The apparatus of claim 7, where the charging alert indicator module changes the appearance of the battery charge status indicator from a first state to a second state to indicate the low charge condition and from the second state to the first state when the battery charge status indicator reaches the level indicative of the battery having enough energy for the electric vehicle to reach one or more of the next battery charging location and the final destination.

9. The apparatus of claim 1, wherein the target adjustment module adjusts the charging target to a lower value to reflect usage of stored battery charge in addition to an amount of energy stored in the battery during battery charging, the lower value representing a battery charge status corresponding to a lower battery charge state than a previous value of the charging target.

10. The apparatus of claim 1, wherein the target adjustment module adjusts the charging target to one or more lower values while the electric device uses energy during one or more of the schedule and traveling along the planned route.

11. The apparatus of claim 1, wherein the target adjustment module adjusts the charging target to a higher value in response to the electric device reaching a battery charging location and in response to a planned amount of charging at the battery charging location.

12. The apparatus of claim 1, wherein the battery status module changes the battery charge status indicator to a higher value in response to a measured amount of battery charging and wherein the battery status module changes the battery charge status indicator to a lower value in response to a measured amount of battery discharging.

13. The apparatus of claim 1, further comprising a charge duration module that indicates on the electronic display a charge time for battery charging at a battery charging location, wherein the charge time indicates an amount of charging so that the battery charge status indicator reaches at least a current charging target value.

14. The apparatus of claim 13, further comprising a catch up module that determines that a current battery charge status is below a charging target lower threshold, the charging target lower threshold relative to a current charging target, and that increases a charge time, in response to the battery charge status being below the charging target lower threshold, at one or more subsequent battery charging locations to return the battery charge status indicator to a desired battery charge status.

15. The apparatus of claim 1, wherein the battery charge status comprises an amount of battery charge within a battery charge status range, wherein the battery charge status range represents one or more of
 an amount of energy for the electric device to travel the planned route; and
 an amount of energy for the electric device to operate during the schedule.

16. A system comprising:
 an electric vehicle comprising a battery that provides power to the electric vehicle, the battery and electric vehicle configured to allow charging of the battery at a battery charging location on a designated route of travel of the electric vehicle;
 an electronic display mounted on the electric vehicle;
 a battery status module that displays a battery charge status indicator on the electronic display of the electric vehicle, the battery charge status indicator for the battery;
 a charging target module that displays a charging target on the electronic display, the charging target related to the battery charge status indicator and indicating a desired charge level for the battery; and
 a target adjustment module that adjusts the charging target based on a location of a next battery charging location on the designated route and an amount of battery charge required to complete the designated route a specified number of times and to reach a final destination after a final battery charging location along the designated route.

17. The system of claim 16, further comprising one or more battery chargers located at the battery charging locations.

18. A method comprising:
 displaying a battery charge status indicator on an electronic display of an electric vehicle, the battery charge status indicator for a battery providing power to the electric vehicle, the battery charging at one or more predefined battery charging locations along a designated route of the vehicle;
 displaying a charging target on the electronic display, the charging target related to the battery charge status indicator and indicating a desired charge level for the battery; and
 adjusting the charging target based on a location of a next battery charging location on the designated route and an amount of battery charge required to complete the designated route a specified number of times and to reach a final destination after a final battery charging location along the designated route.

19. The method of claim 18, further comprising adjusting the charging target to one or more lower values while the electric vehicle travels along the designated route and adjusting the charging target to a higher value in response to the electric vehicle reaching a battery charging location and in response to a planned amount of charging at the battery charging location.

20. The method of claim 18, further comprising changing the battery charge status indicator to a higher value in response to a measured amount of battery charging and changing the battery charge status indicator to a lower value in response to a measured amount of battery discharging.

21. The method of claim 18, further comprising indicating on the electronic display a charge time for battery charging at a battery charging location, wherein the charge time indicates an amount of charging so that the battery charge status indicator reaches at least a current charging target value.

22. The method of claim 21, further comprising determining that a current battery charge status is below a desired battery charge status, the desired charge status relative to a current charging target at a current battery charging location and relative to a desired charging time at the battery charging location, and increasing a charge time at one or more subsequent battery charging locations to return the battery charge status indicator to a desired battery charge status.

23. The method of claim 18, further comprising changing the electronic display to indicate a low charge condition, the low charge condition indicating that a current battery charge status is below a level sufficient for the electric vehicle to reach one or more of a next battery charging location and the final destination, and further comprising changing the electronic display to stop indicating the low charge condition in response to the battery charge status indicator reaching a level indicative of the battery of the electric vehicle having enough energy for the electric vehicle to reach one or more of the next battery charging location and the final destination.

\* \* \* \* \*